United States Patent [19]
Davidson

[11] Patent Number: 6,119,858
[45] Date of Patent: Sep. 19, 2000

[54] CARRYING CASE FOR FISHING EQUIPMENT

[75] Inventor: Richard A. Davidson, Ontario, Canada

[73] Assignee: The Fishing Locker, Inc., Bloomington, Minn.

[21] Appl. No.: 09/392,425

[22] Filed: Sep. 9, 1999

Related U.S. Application Data

[60] Provisional application No. 60/103,340, Oct. 7, 1998.

[51] Int. Cl.[7] ................................................. B65D 85/00
[52] U.S. Cl. ..................................... 206/315.11; 190/109
[58] Field of Search ........................... 206/315.11, 320; 190/109, 110, 111; 220/528

[56] References Cited

U.S. PATENT DOCUMENTS

| | | | |
|---|---|---|---|
| D. 318,371 | 7/1991 | Leverette | D3/38 |
| 2,097,185 | 10/1937 | Hall | 43/31 |
| 3,348,329 | 10/1967 | Seemann | 43/26 |
| 4,170,801 | 10/1979 | Ward | 9/1.1 |
| 4,306,601 | 12/1981 | Wallis et al. | 150/52 R |
| 4,781,277 | 11/1988 | Lim | 190/109 |
| 5,052,555 | 10/1991 | Harmon | 206/315.11 |
| 5,310,103 | 5/1994 | Weber et al. | 224/311 |
| 5,319,874 | 6/1994 | Vance | 43/26 |
| 5,327,669 | 7/1994 | Lannan et al. | 43/26 |
| 5,474,204 | 12/1995 | Sutyla | 220/528 |

*Primary Examiner*—David I. Fidei
*Attorney, Agent, or Firm*—Westman, Champlin & Kelly; S. Koehler

[57] ABSTRACT

This invention is directed to a carrying case for fishing rods and reels and related equipment. The case contains one or more portions comprising support surfaces and recessed compartments where the rods and reels are securely fastened. Interposed between the recessed compartments are storage compartments that can be utilized to store other equipment. The case is designed to afford easy accessibility to the rods as well as the storage compartments while still providing the necessary protection and ease of transportation. The fasteners for the rods and reels are situated so as to secure the rods and reels in alternately disposed positions. Because of this design, the carrying case furnishes protection for multiple rods and reels while providing extra storage compartments for additional equipment, thereby maximizing the space used by the case.

20 Claims, 6 Drawing Sheets

CARRYING CASE FOR FISHING EQUIPMENT

CROSS-REFERENCE TO RELATED APPLICATION

This application is based on and claims the benefit of Provisional Patent Application Serial No. 60/103,340 filed Oct. 7, 1998.

BACKGROUND OF THE INVENTION

The present invention relates to carrying cases for sporting equipment. More particularly, the present invention relates to carrying cases for fishing equipment.

The transportation and storage of fishing equipment between uses presents several challenges. These challenges include attempts to protect the equipment and to provide a manageable manner in which to carry the equipment. Some prior art cases are either elongated tubes or rigid cases. Yet, in many cases, removal of the reel from rod is necessary before storage. Furthermore, neither type provides easy accessibility to the rods and reels and easy transportation of the case.

While some carrying cases provide space to hold more than one rod and reel assembly, current cases lack a unitary construction that maximizes the space used to house the equipment. Current designs also fail to provide adequate protection for the rods and reels, while still providing ease of accessibility, use and transportation. An improved carrying case that addresses one, some or all of these concerns is therefore desired.

SUMMARY OF THE INVENTION

A multi-compartment carrying case for fishing equipment includes an inner bottom wall, at least two spaced-apart support surfaces and wall portions joining edges of the spaced-apart support surfaces to the inner bottom wall to define at least one recessed compartment opening to the spaced-apart support surfaces and at least two storage compartments having walls defined by separation of the spaced-apart support surfaces and the inner bottom wall. A cover covers the spaced-apart support surfaces, the recessed compartment and the storage compartments. In some embodiments, the cover can further comprise a second portion having a recessed compartment, support surfaces and storage compartments similar to the portion having the first-mentioned recessed compartment, support surfaces and storage compartments.

DETAILED DESCRIPTION OF THE ILLUSTRATIVE EMBODIMENTS

Figure 1:
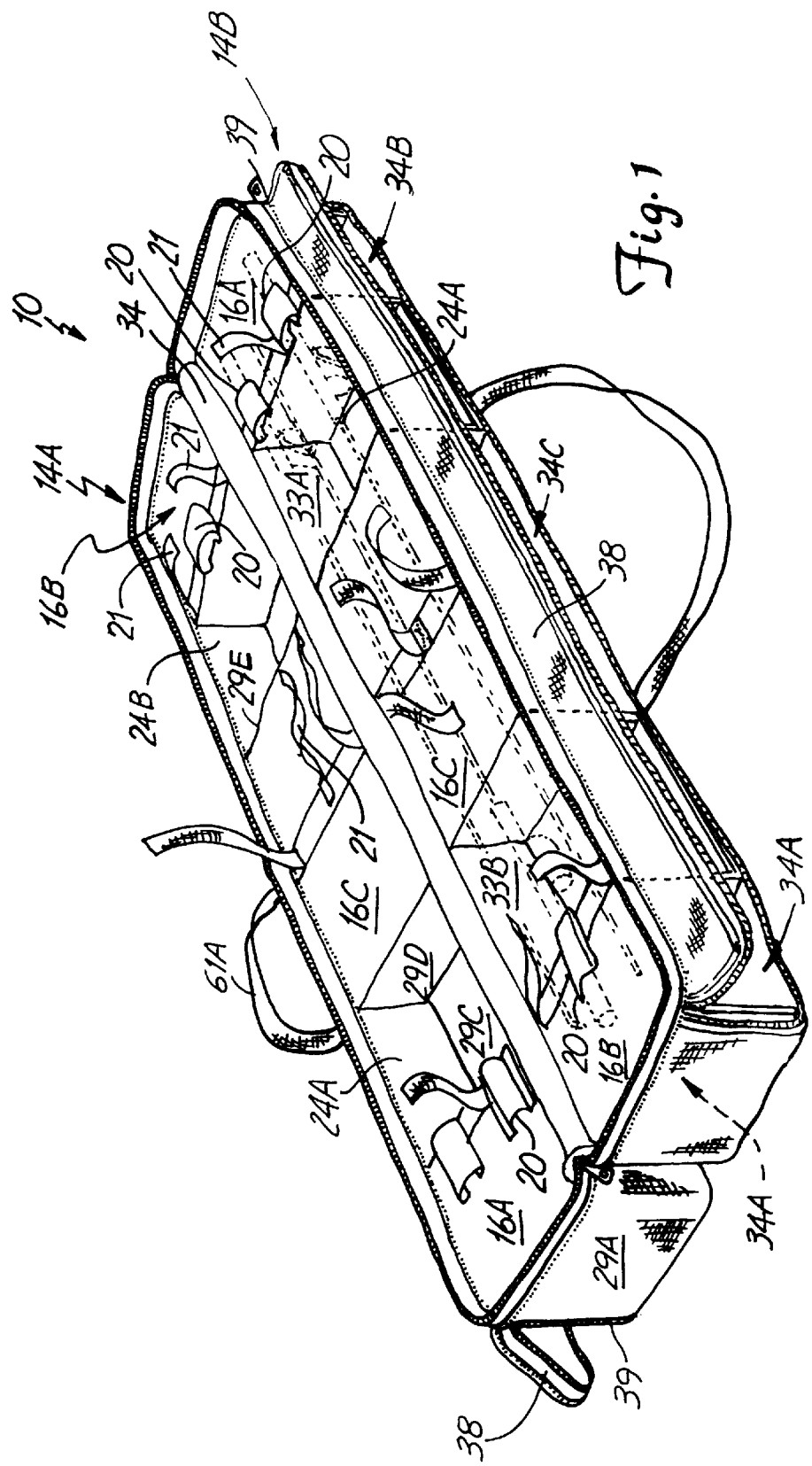
FIGS. 1 and 2 are perspective views of one embodiment of the invention, which includes two separate portions forming a clam shell arrangement.

Referring now to FIG. 1, the case 10 of a first embodiment is illustrated as a clam shell structure having a first portion 14A and a second portion 14B. Each portion or assembly 14A and 14B includes end support surfaces 16A and 16B and a center support surface 16C located therebetween. The support surfaces 16A–16C further include fasteners, which are suitable for holding segments of the rods and reels in place. In the embodiment illustrated in FIG. 1, the fasteners comprise loops 20, which are attached to end support surfaces 16A and 16B to receive the handles of fishing rod and reel assemblies, and Velcro fasteners 21, which are provided on support surfaces 16A–16C to hold rod segments of the rod and reel assemblies in position. As appreciated by those skilled in the art, other suitable fastening devices can be used, such as ties, clips, snaps, etc.

Both portions 14A and 14B also preferably include recessed compartments 24A and 24B adapted to receive the reels of the rod and reel assemblies. In this manner, the reels extend downwardly into the recessed compartments 24A and 24B, while the rod segments of the rod and reel assemblies are secured to the support surfaces 16A–16C by the fasteners 20 and 21. As indicated in FIG. 1, the fasteners 20 and 21 are arranged such that compartment 24A can receive up to two reels while compartment 24B can receive a single reel, wherein the rod part for the reel in compartment 24B extends between the reels of compartment 24A and the handle for the rods are secured by loops 20. In other words, the fasteners 20 and 21 are disposed on the support surfaces 16A–16C so as to hold the rods and reels in an anti-parallel orientation. In the embodiment illustrated, portion 14A can hold three rods and reels in an alternating, anti-parallel arrangement.

Portion 14B is similarly constructed to portion 14A, but the fasteners 20 and 21 for portion 14B are arranged such that the fasteners are opposite to the fasteners 20 and 21 of portion 14A. In this manner, each portion of the case will hold three reels where, once again, rod segments and reel segments are alternately disposed.

In one embodiment, each portion 14A and 14B also includes one or more of storage compartments 34A, 34B, and 34C for storage of such articles as other fishing or related items. These items may include such things as tackle boxes, raincoats, shoes, food, etc. As illustrated, each of the storage compartments 34A–34C of case 10 is defined, or formed in part, by one of the support surfaces 16A–16C, thereby maximizing storage space by interposing the recessed compartment 24A between storage compartments 34C and 34B, and recessed compartment 24B between storage compartments 34A and 34C. In the embodiment illustrated in FIG. 1, a removable single cover 38 is secured to each of the portions 14A and 14B to cover each of the respective storage compartments 34A–34C. In particular, zipper 39 extends along at least a portion of the perimeter of the cover 38 and is used to secure the cover 38 in place. As appreciated by those skilled in the art, other means to secure such as Velcro, snaps, ties, buttons, etc. can also be used to secure cover 38 to each of the respective portions 14A–14B. In addition, multiple covers can be used to separately cover each of the storage compartments 34A–34C.

Figure 2:
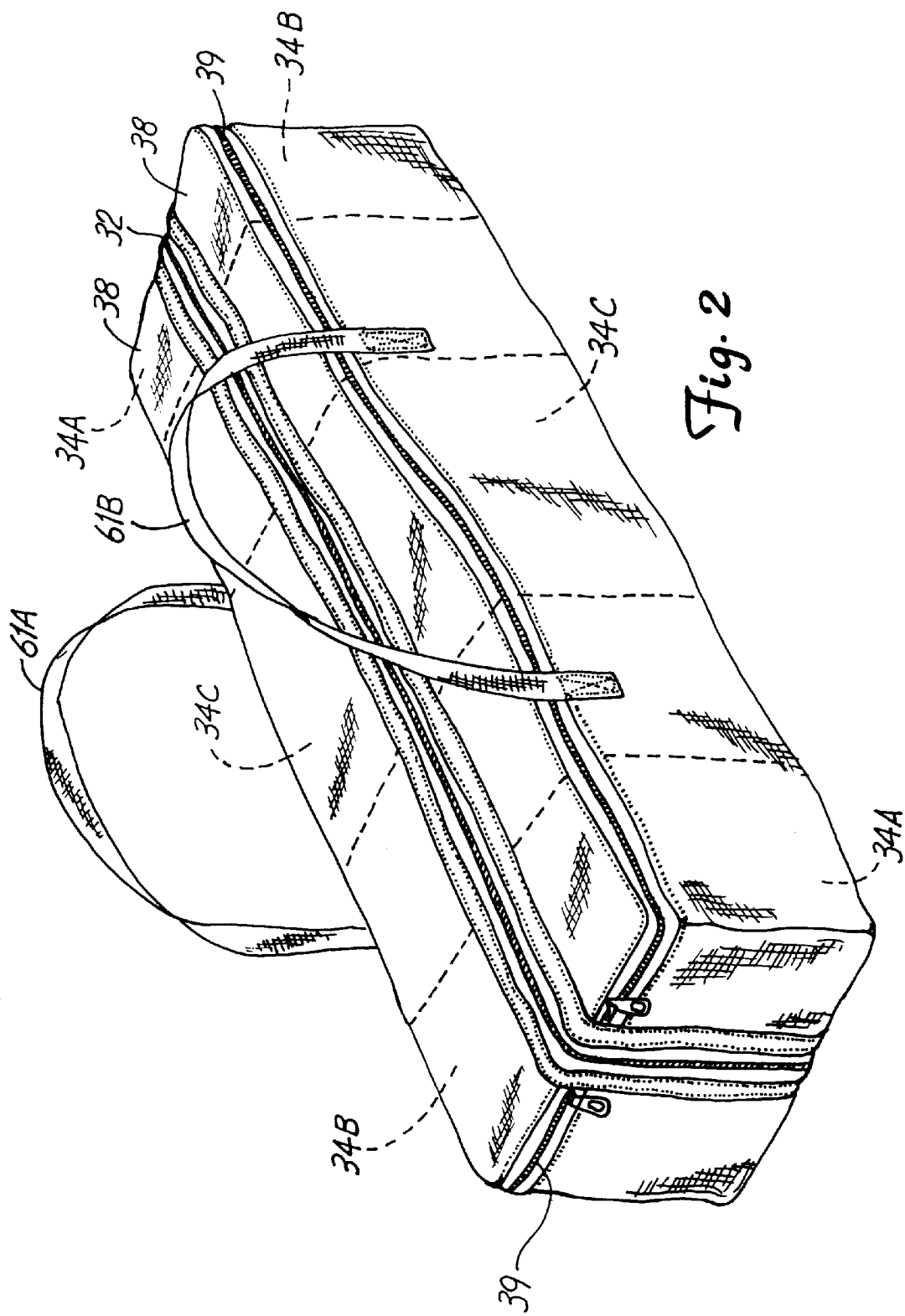

In one embodiment, the case 10 is manufactured from a flexible material such as nylon or other durable, water-resistant material. If desired, a rigid material such as foam, metal, plastic, cardboard, wood, fiberglass, or the like, can be used in some or all the walls forming the portions 14A and 14B. In the embodiment illustrated, a center portion 34 of flexible material operates as a hinge to allow the portions 14A and 14B to be brought together and separated with the recessed compartments 24A and 24B of each portion 14A and 14B facing each other. In general, portion 14A functions as a cover for the recessed compartments 24A and 24B and the support surfaces 16A–16C of portion 14B and vice versa. If desired, other hinge mechanisms may be used, such as a panel hinge. The portions 14A and 14B can be secured together as illustrated in FIG. 2 with a retainer such as a perimeter zipper 32. As appreciated by those skilled in the art, other devices such as ties, snaps, Velcro, buttons, etc., can be used to retain the portions 14A and 14B together.

Figure 3:
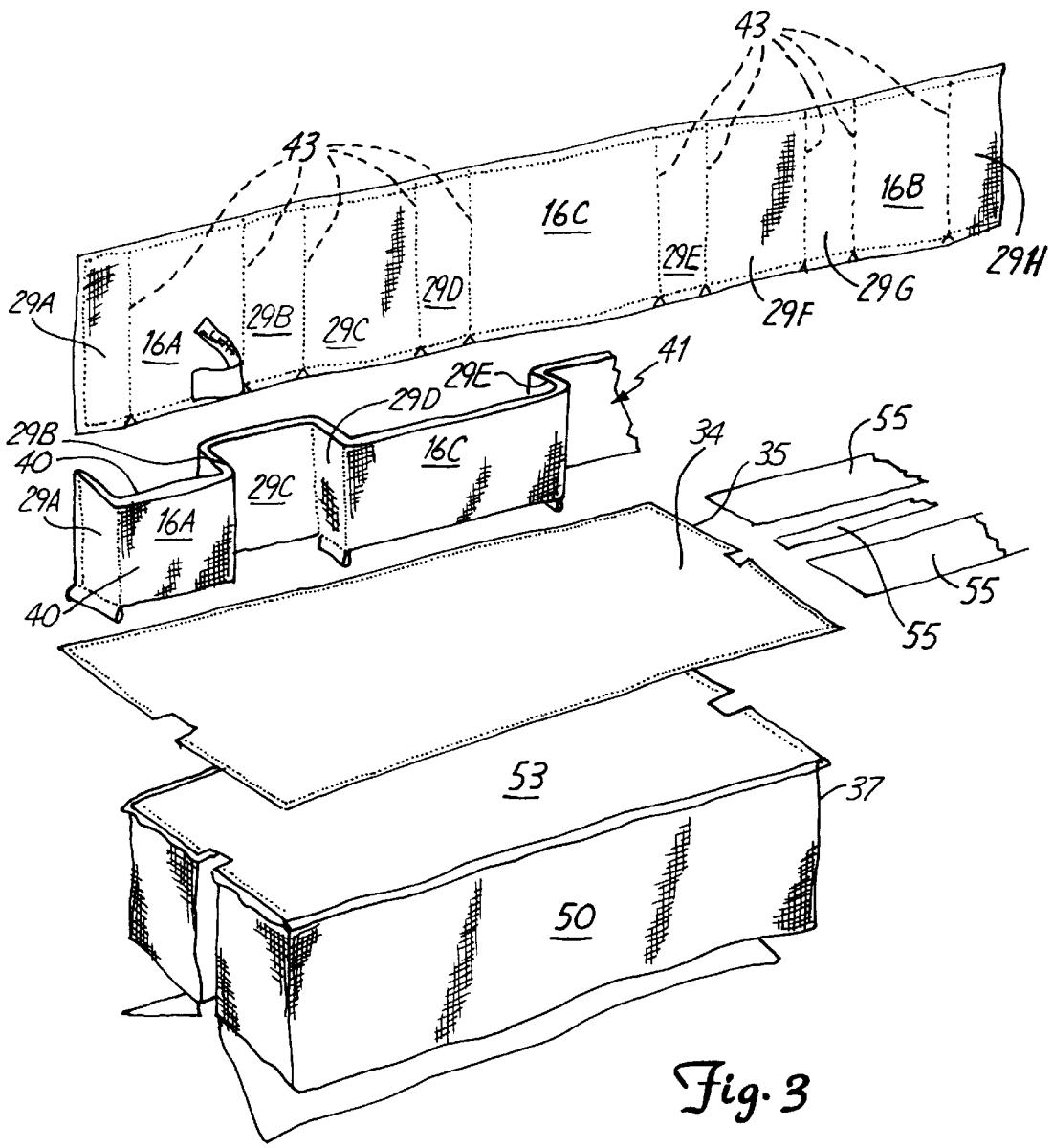
FIG. 3 is a partial exploded view illustrating various components used to form sections of the case in a preferred embodiment.

Some or all of the surfaces or walls of the recessed compartments 24A and 24B and storage compartments 34A–34C are padded so as to protect items placed therein. FIG. 3 illustrates a segmented fabric panel 41 that can be used as one method to form many of the walls of the recessed compartments 24A and 24B as well as the storage compartments 34A–34C. In this embodiment, two fabric sheets 40 are joined, for example sewn, together along dashed lines 43 to define each segmented portion, resulting in segmented fabric panel 41.

A padding material, such as rigid or semi-rigid foam, can be inserted separately into each segmented portion of panel 41 or inserted as a layer panel and compressed during sewing along dashed lines 43. The padding material provides a cushion as well as rigidity for the carrying case 10. Referring to FIGS. 1 and 3, the segments 29A–29H and support surfaces 16A and 16C are identified with similar reference numbers. Once the segmented fabric panel 41 is formed, a continuous member 35 such as fabric material is then sewn or otherwise secured to at least some of the edges of the segmented fabric panel 41 in order to provide end walls. In a preferred embodiment, the end walls for portions 14A and 14B are formed from a single member and include hinge portion 34.

In the embodiment illustrated, a shell 37 is then attached to the fabric material 35 to form the remaining walls for the storage compartments 34A–34C and the recessed compartments 24A and 24B. As appreciated by those skilled in the art, separate panels can be used to form walls for the storage compartments 34A–34C, in particular, the walls opposite support surfaces 16A–16C. In the embodiment illustrated, continuous member 50 integrates the separate panels as a single component. Shell 37 includes a panel 53 to which member 35 is attached. Sheets of rigid panel 55, such as plastic, can be inserted in between panels 35 and 53 to form the center portion 34 and other portions to provide stiffness and rigidity. As with the segmented fabric panel, the shell 37 may be fashioned from two pieces of fabric and then stuffed with suitable padding, if desired. In addition, a zipper may be used where two pieces of material are present to provide additional compartments in the carrying case 10.

Figure 4:
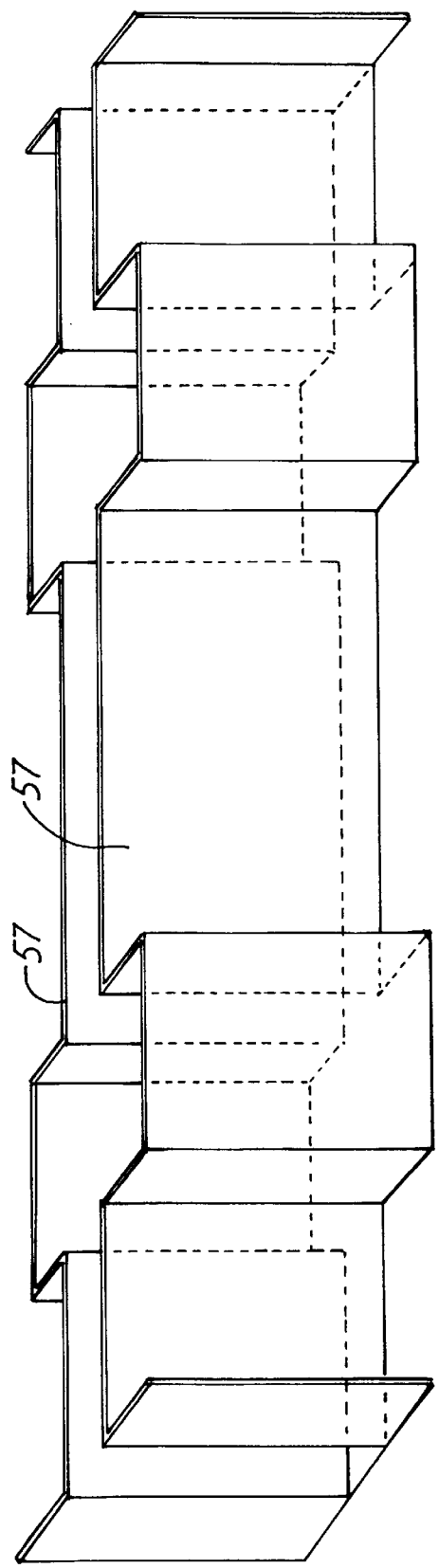
FIG. 4 is a partial perspective view illustrating a sheet of material which may also be used to form sections of the case.

In another embodiment illustrated in FIG. 4, a rigid sheet of material 57 is used in place of segmented fabric panel 41 to define the recessed compartments 24A and 24B and the storage compartments 34A–34C. The rigid sheet of material 57 is then attached to the carrying case in a manner similar to the technique used to integrate panel 41. Padding can be attached to the sheet of material 57 or to fabric surrounding the sheet of material in order to provide a cushion material in the compartments as desired. Suitable materials for member 57 include foam, metal, plastic, cardboard, wood, fiberglass, etc. These materials can be solid, hollow (for example, corrugated) or have air pockets.

Figure 5:
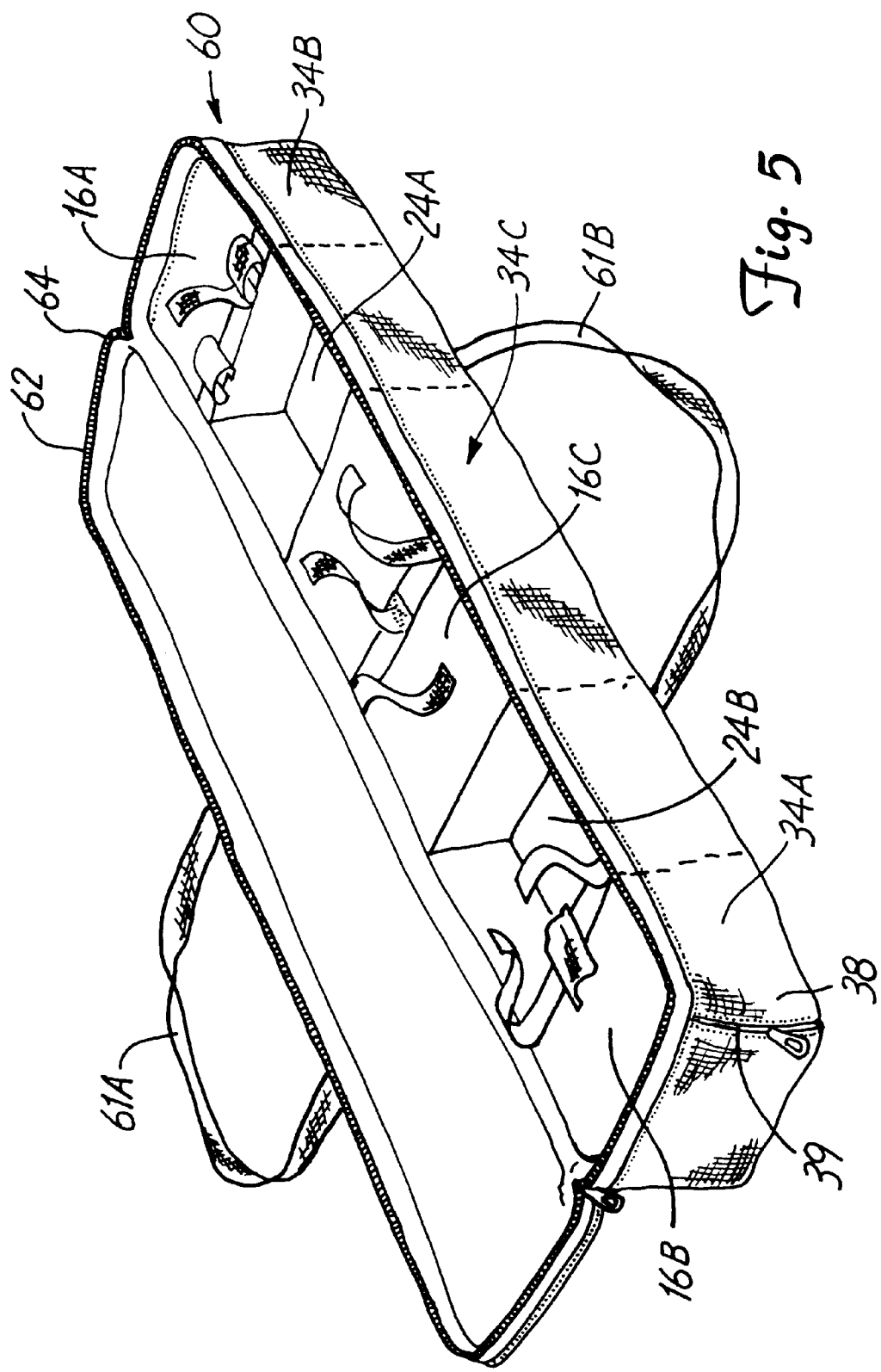
FIG. 5 is a perspective view of a second embodiment of the invention.

The embodiment illustrated FIG. 5 is substantially similar to the embodiment illustrated in FIG. 1, with the exception that case 20 comprises a single portion 60 and a cover 62. A zipper 64 removably secures the cover 62 to the portion 60, allowing the cover 62 to open and allow access to the rod and reel storage compartment (recessed compartments 24A–24B and support surfaces 16A–16C) Although illustrated wherein separate covers 62 and 38 are provided, a single cover that covers both the recessed compartments 24A–24B, support surfaces 16A–16C and storage compartments 34A–34C can be used. In the embodiment illustrated, carrying straps 61A and 61B are secured to the case 60, preferably in the middle thereof. Also, wheels can be attached to the case 20 for example, at the ends thereof to aid in transportation of the carrying case 20.

Figure 6:
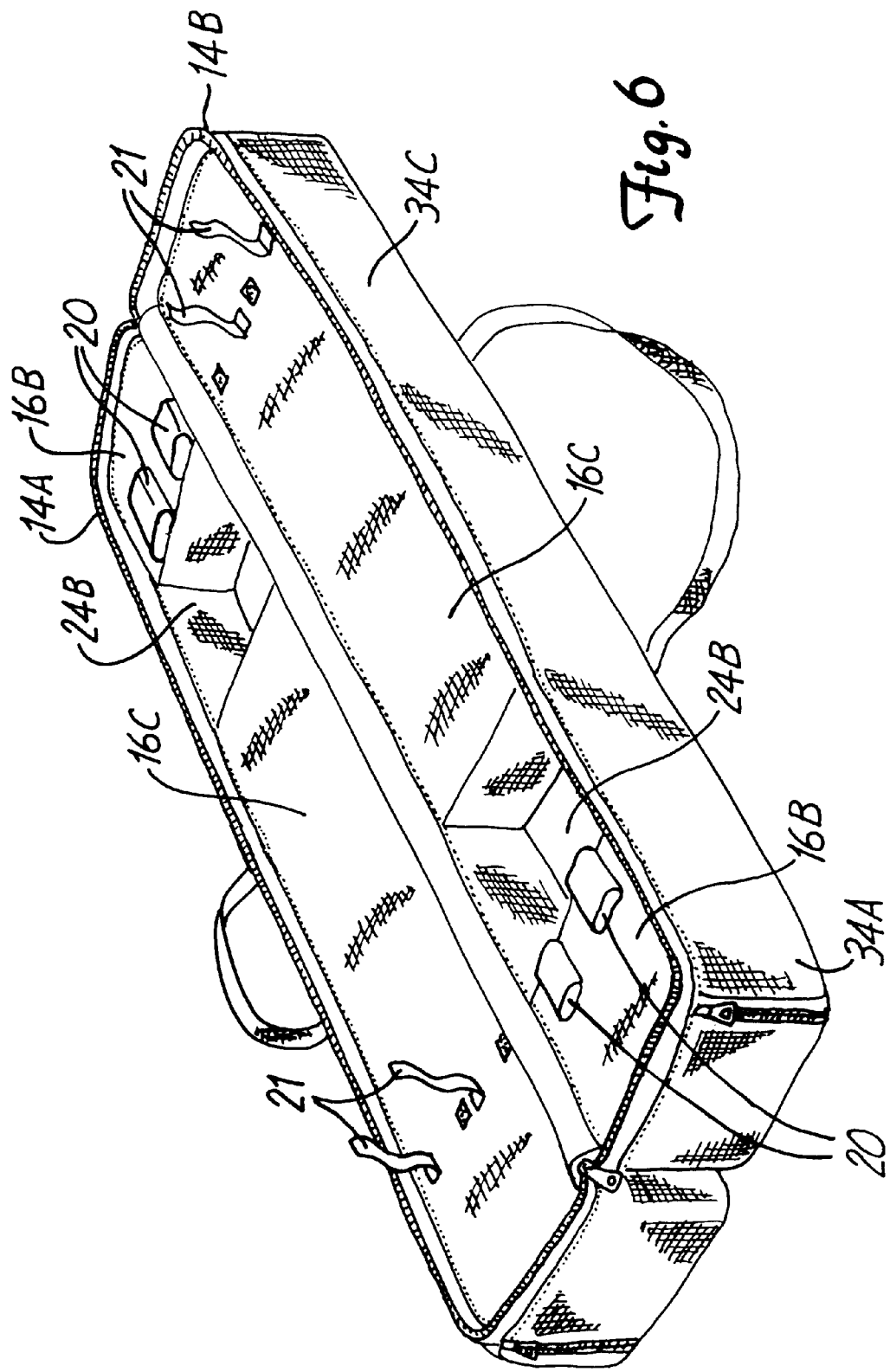
FIG. 6 is a perspective view of a third embodiment of the invention.

FIG. 6 illustrates a third embodiment also comprising a clam shell structure having portions 14A and 14B. However, in this embodiment, each of the portions 14A and 14B comprise a single recessed compartment 24B interposed between support surfaces 16B and 16C. Storage compartments 34A and 34C are disposed on opposite sides of the recessed compartment 24B and are accessible through cover 38. If desired, one or more dividing walls can be provided to form additional, smaller storage compartments than just the two illustrated at 34A and 34C. As in the previous embodiments, fasteners 20 and 21 are provided to secure the rods within the case.

In the embodiment illustrated, the portions 14A and 14B are hinged and oriented in an anti-parallel orientation so that each recessed compartment 24B faces support surface 16C on the other portion 14A, 14B. This orientation balances the case. If desired, the recessed compartments 24B of each portion can be located at the same end. It should also be noted that one of the portions 14A and 14B can be replaced with a simple cover, such as illustrated in the previous embodiment, that covers the recessed compartment 24B and the support surfaces 16B and 16C.

Although the present invention has been described with reference to preferred embodiments, workers skilled in the art will recognize that changes may be made in form and detail without departing from the spirit and scope of the invention.

What is claimed is:

1. A multi-compartment carrying case, comprising:
   an inner bottom wall;
   at least two spaced-apart support surfaces;
   wall portions joining edges of the spaced-apart support surfaces to the inner bottom wall to define a recessed compartment opening to the spaced-apart support surfaces and at least two storage compartments having walls defined by separation of the spaced-apart support surfaces and the inner bottom wall; and
   a cover covering the recessed compartment, the spaced-apart support surfaces and the storage compartments.

2. The multi-compartment carrying case of claim 1, wherein the storage compartments are accessed orthognally, with respect to the recessed compartment, through the cover covering the storage compartments.

3. The multi-compartment carrying case of claim 1, wherein the cover comprises a first cover covering the recessed compartment and the support surfaces, and a second cover covering the storage compartments.

4. The multi-compartment carrying case of claim 1, wherein the first cover comprises a second assembly comprising:
   a second inner bottom wall;
   at least two second spaced-apart support surfaces;
   second wall portions joining edges of the second spaced-apart support surfaces to the second inner bottom wall to define a second recessed compartment opening to the spaced-apart second support surfaces and at least two second storage compartments having walls defined by separation of the spaced-apart second support surfaces and the second inner bottom wall; and wherein the case further comprises a hinge joining the first and second assemblies and allowing the first and second assemblies to be selectively positioned adjacent each other with the first mentioned recessed compartments facing opposite directions folded and fastened together.

5. The multi-compartment carrying case of claim 1, wherein the carrying case further comprises fasteners attached to the spaced-apart support surfaces, the fasteners adapted to secure portions of a rod and reel in place.

6. The multi-compartment carrying case of claim 5, wherein the carrying case further comprises fasteners attached to the spaced-apart support surfaces, the fasteners adapted to secure up to three rods and reels, in an alternating, anti-parallel orientation.

7. The multi-compartment carrying case of claim 1, wherein the outer case is manufactured of flexible material.

8. The multi-compartment carrying case of claim 1, wherein said at least some of the walls of the recessed compartments and the spaced-apart storage compartments include a cushioning material.

9. The multi-compartment carrying case of claim 8, wherein said at least some of the walls of the recessed compartments and the storage compartments comprise:

two fabric sheets which are joined together to define segmented portions; and padding material that is inserted into each segmented portion.

10. A multi-compartment carrying case for a fishing rod and reel, comprising:

a structure having a recessed compartment and orthogonally accessed storage compartments formed from a continuous member having wall portions oriented substantially orthogonal to each other, the recessed compartment being adapted to receive a reel and disposed in between support surfaces forming the storage compartments;

a fastener secured to the support surface adapted to hold the rod; and a cover for each compartment to prevent access to the compartment and being at least partially removable to gain access to the respective compartment, wherein the cover covering the recessed compartment further covers the support surfaces.

11. The multi-compartment carrying case of claim 10, wherein the cover comprises a first cover covering, the recessed compartment and the support surfaces, and a second cover covering the storage compartments.

12. The multi-compartment carrying case of claim 11, wherein the second cover covers both of the storage compartments.

13. The multi-compartment carrying case of claim 10, wherein the structure includes two recessed compartments each of which is adapted to receive a reel, and wherein each recessed compartment is disposed between two support surfaces.

14. The multi-compartment carrying case of claim 10, the fastener comprises members to hold three rods and reels, wherein one reel is disposed in one recessed compartment and two reels are disposed in the other recessed compartment.

15. A multi-compartment carrying case for fishing rods and reels comprising:

first and second assemblies, each assembly comprising:

a structure having a recessed compartment and orthogonally accessed storage compartments formed from a continuous member having wall portions oriented substantially orthogonal to each other, the recessed compartment being adapted to receive a reel and disposed in between support surfaces forming the storage compartments;

a fastener secured to the support surface adapted to hold the rod;

a cover for covering the storage compartments; and wherein the first and second assemblies are hingeably joined so that the recessed compartments and the support surfaces of each assembly can be selectively positioned to face each other.

16. The multi-compartment case of claim 15 and a retainer holding the first and second assemblies adjacent each other so that compartments accessible from the second direction of each assembly face each other.

17. The multi-compartment case of claim 16 wherein the retainer comprises a zipper.

18. The multi-compartment carrying case of claim 15, wherein each assembly includes two recessed compartments each of which is adapted to receive a reel, and wherein each recessed compartment is disposed between two support surfaces.

19. The multi-compartment carrying case of claim 15, the fastener comprises members to hold three rods and reels, wherein one reel is disposed in one recessed compartment and two reels are disposed in the other recessed compartment.

20. The multi-compartment carrying case of claim 15 wherein the continuous member comprises a segmented fabric assembly having padding provided between fabric panels.

* * * * *